INVENTORS
DIRK LANDMAN
EDMUND G. PINGER

ATTORNEYS

Oct. 19, 1971  D. LANDMAN ET AL  3,613,213
STAKING MACHINE
Original Filed Nov. 1, 1967
7 Sheets-Sheet 7
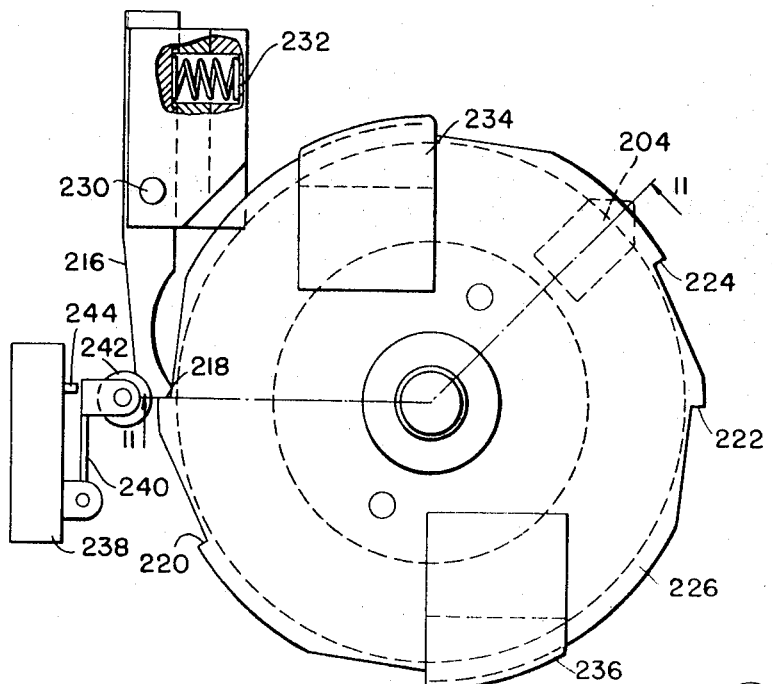
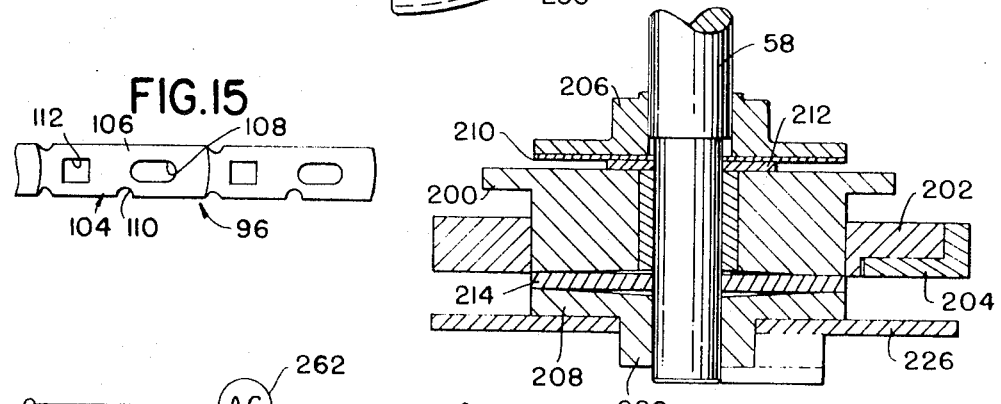
INVENTORS
DIRK LANDMAN
EDMUND G. PINGER
BY
ATTORNEYS United States Patent Office 3,613,213
Patented Oct. 19, 1971

3,613,213
STAKING MACHINE
Dirk Landman, Mechanicsburg, and Edmund G. Pinger,
Freeland, Pa., assignors to Berg Electronics, Inc., New
Cumberland, Pa.
Original application Nov. 1, 1967, Ser. No. 679,675.
Divided and this application July 22, 1969, Ser.
No. 870,890
Int. Cl. H05k 13/04
U.S. Cl. 29—203 B          17 Claims

ABSTRACT OF THE DISCLOSURE

A machine is provided for successively staking terminals onto an arcuate or semi-circular terminal board. The terminal board is of the type used in electrical apparatus. The staking structure is provided in a punch press which has a lower fixed die shoe and an upper movable die shoe. The lower die shoe carries a support structure for the terminal board. The support structure is mounted on a spring so that it will be depressed during the staking operation. Clamp means are provided to releasably secure the terminal board onto the support structure. The clamp means permit slight tilting of the board during staking to result in good seating of terminals. Additional roller clamp means are provided for firm pressure engagement with the outer rim of terminal boards.

This application is a division of our copending application, Ser. No. 679,675, filed Nov. 1, 1967, now abandoned.

A staking mechanism is provided and includes a punch element mounted on the upper die shoe and an anvil element mounted on the lower die shoe. A terminal having a tubular staking portion is positioned in alignment with the punch. The punch then engages the terminal and drives the tubular portion through an opening in the terminal board into contact with the anvil. The punch is then moved further downward to stake over the tubular portion. Simultaneously, the support structure which carries the terminal board is moved toward the anvil. The terminal board may tilt during the actual staking operation to provide satisfactory seating of the terminal. After a terminal is staked onto a board, the board is indexed to a position where a new opening is in alignment with the punch and anvil. A new lead terminal is fed from a chain form of terminal into position for staking. A cutting mechanism is provided to sever the new terminal from the chain after the punch has engaged the terminal and before the terminal is staked onto the board.

BACKGROUND OF THE INVENTION

Staking machines of the type contemplated by the present invention have been proposed in the past. In such machines, the basic object is to provide automatic means for staking a plurality of terminals onto a board. The machines are designed for mass production and desirably operate at relatively high speeds in order to permit an operator to produce a maximum number of finished boards per unit of time.

The present invention provides such a machine and a method of staking in which high production is obtained. At the same time, the machine is so designed to result in a quality job. One problem in connection with prior art devices has been to avoid an improperly seated terminal. In accordance with the present invention, the board itself moves during the staking operation and may also be tipped or tilted during the staking operation to assure proper alignment between the terminal and the board. Additionally, the feeding of individual terminals to the machine is correlated with the staking opeation by a cutting device for severing the lead or endmost terminal from a terminal chain form prior to the staking operation.

As used herein, the term "terminal" is meant to include any lug or like device which is applied to a work member for the purpose of providing an electrical connection. Additionally, the term "staking" is meant to include the turning over or flaring of a tubular rivet-like portion of a terminal or the turning under of a portion of a terminal in the manner of stapling. The workpiece may be a terminal board as illustrated in the disclosure which follows or it may be any other suitable staking support member.

SUMMARY OF THE INVENTION

A machine is provided for applying terminals to a work member having opening means therein for staking of a terminal thereon. The machine comprises a support structure for the work member. The support structure is resiliently mounted and biased to a normal position. Holding means are provided for releasably securing a work member onto the support structure. A staking mechanism is provided including a punch element and an anvil element each positioned on one side of and in alignment with an opening of a work member. The puch element is movable while the anvil element is stationary. Means are provided to drive the punch element toward the anvil element to stake a terminal onto the work member. Means also are provided to move the support structure against the resilient means simultaneously with movement of the punch element and at the same rate whereby a work member is carried toward the anvil member during the staking operation.

The holding means includes structure for only loosely clamping a work member in the direction of movement of the punch element whereby the work member may tilt during the staking operation. The holding means also includes roller clamp means for firm pressure engagement with the board in a direction normal to movement of the board during the staking operation. Indexing means are provided for rotating the support structure after each staking operation to position an additional opening in the work member in alignment with the punch and anvil elements to permit staking of a plurality of terminals onto the work member. The terminals are fed onto the board in a chain form. Means are provided to support the chain form of terminals and for successively moving the endmost terminal of the chain into alignment with the punch and anvil elements. Means are also provided for severing the endmost terminal from the chain form during the staking operation. A resilient support structure is provided for one of the punch and anvil elements to permit deflection thereof during the staking operation to compensate for variations in the thickness of work members.

The method of the invention comprises first positioning a work member on the support structure with an opening of the work member in alignment with the punch and anvil elements. A terminal having an outwardly projecting staking portion is positioned in alignment with the punch. The punch then engages the terminal and drives the projecting portion through the opening in the work member into contact with the anvil. The punch is then moved to stake over the projecting portion. The support structure is simultaneously moved with the punch at this time and carries the work member therealong and at the same rate during said staking operation.

In the drawings:

FIG. 10 is a bottom plan view of the indexing mechanism utilized in the machine of FIG. 1;

FIG. 11 is a sectional view taken substantially along the line 11—11 of FIG. 10, looking in the direction of the arrows;

FIG. 12 is a sectional view illustrating the connection between the air cylinder and clamp of FIG. 2;

FIG. 13 is an electrical schematic illustrating the control circuit for the machine of FIG. 1;

FIG. 14 is a view in perspective of a terminal board to which lugs have been applied in accordance with the present invention; and FIG. 15 is a view of a portion of a chain of terminals utilized by the machine.

Figure 1:
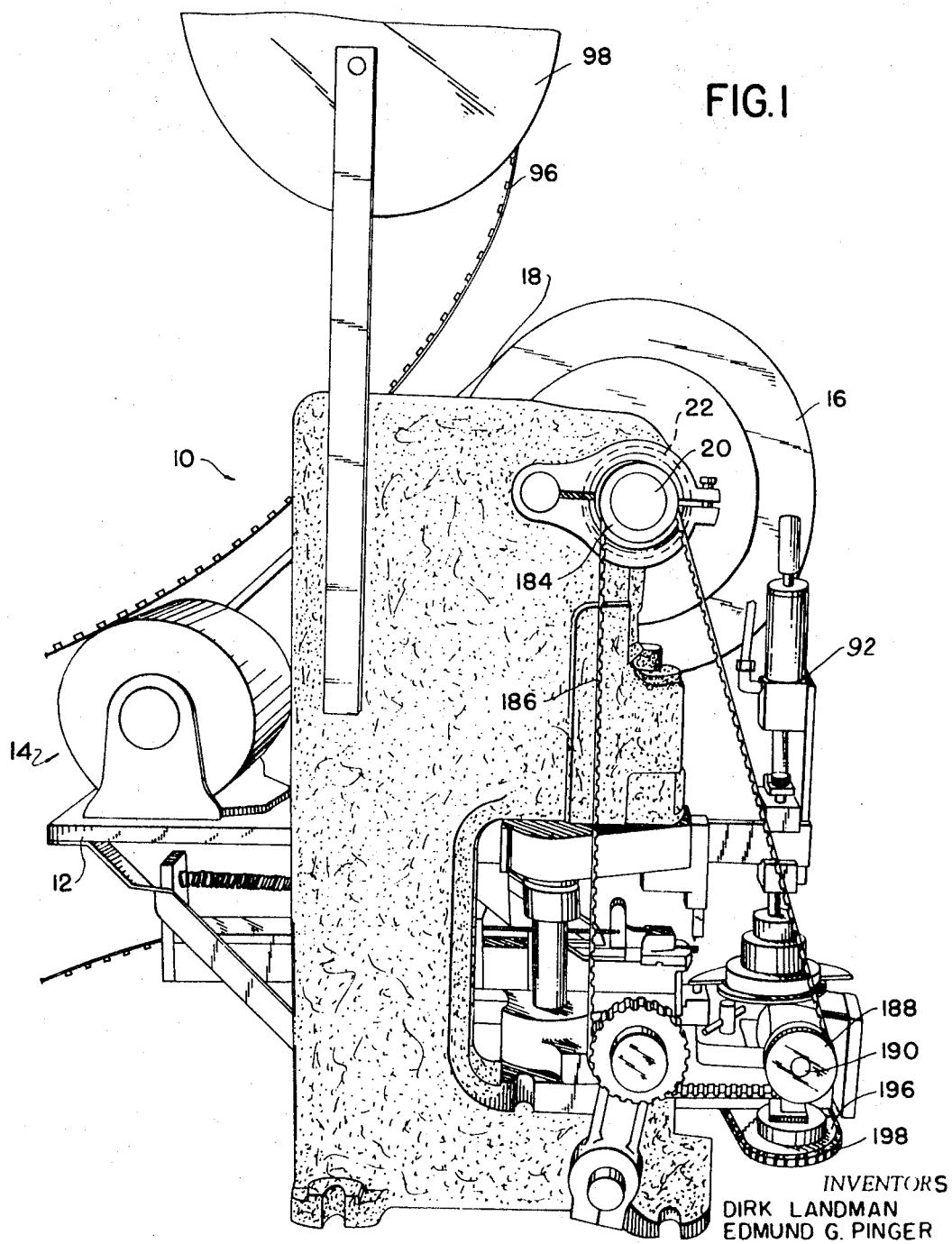
FIG. 1 is a view in perspective of a machine for applying terminals in accordance with one embodiment of the present invention.
Figure 2:
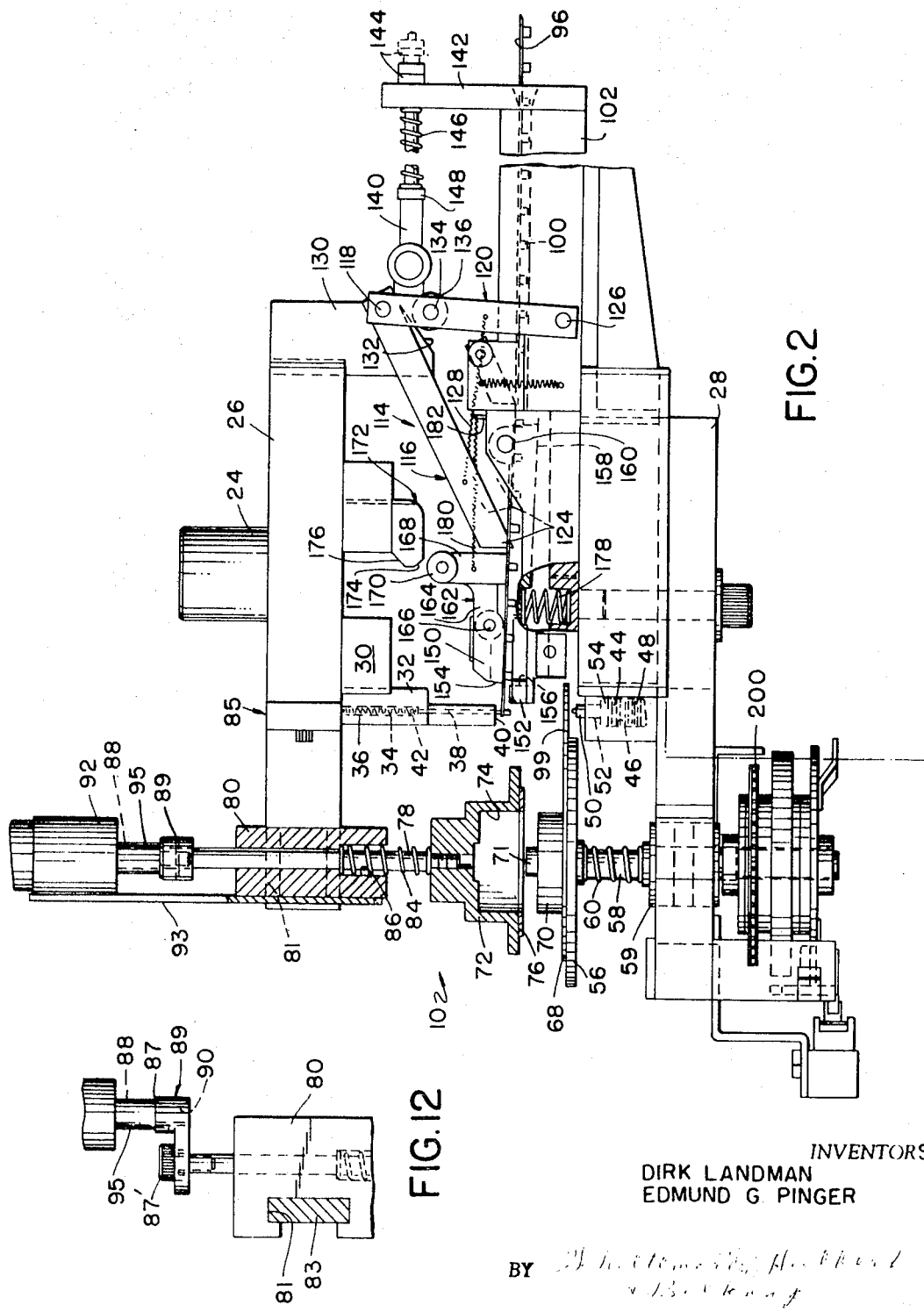
FIG. 2 is a front elevational view of the terminal applying mechanism of the machine of FIG. 1 with portions broken away for the purpose of clarity.
Figure 3:
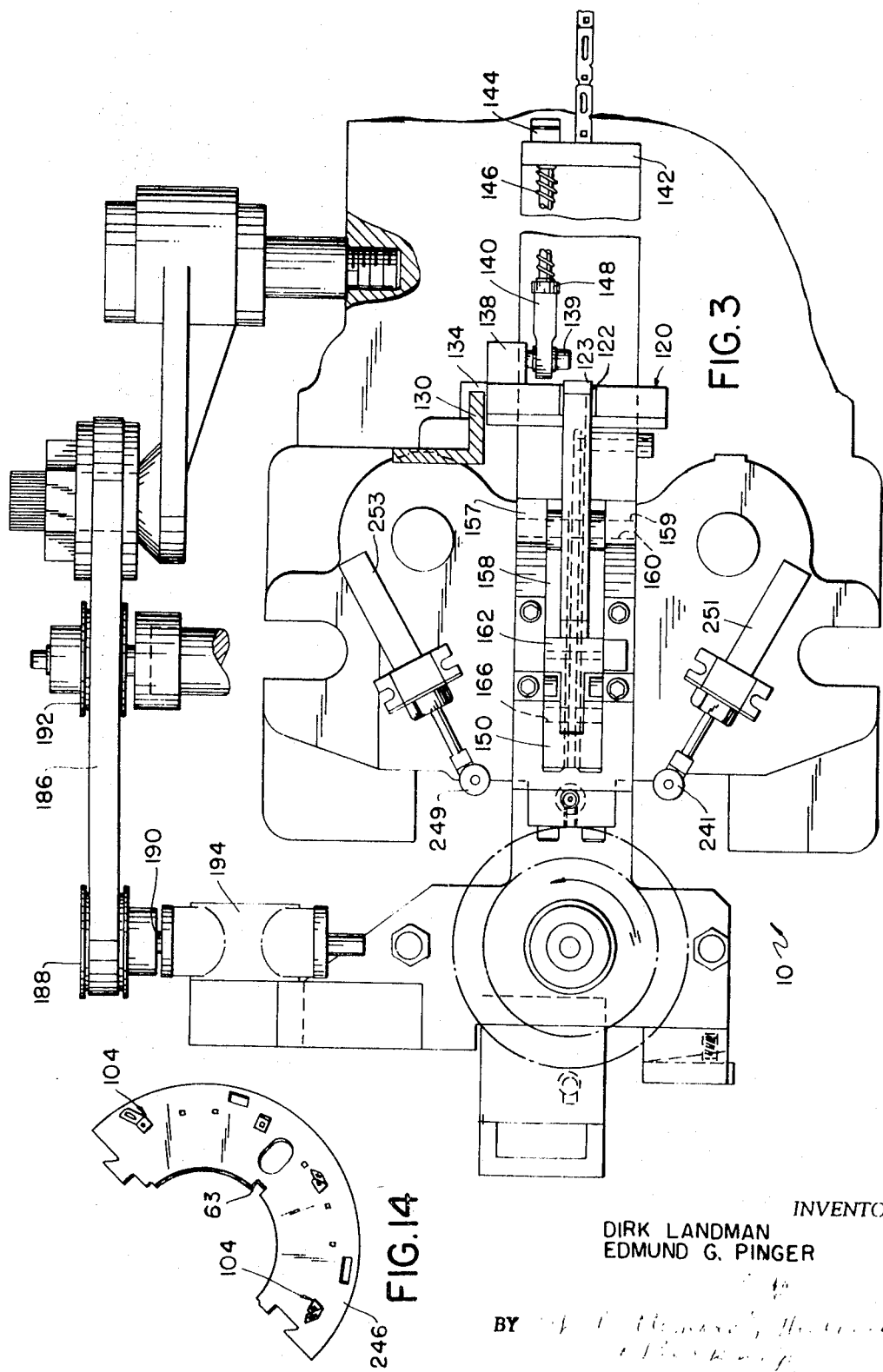
FIG. 3 is a top plan view of the lower portion of the mechanism of FIG. 2.

Referring now to the drawings, particularly FIGS. 1–3, it will be noted that the machine 10 comprises a punch press which includes a support structure 12 upon which is mounted an electric motor 14. The motor 14 is drivingly connected to a flywheel 16 by means of a belt 18. The flywheel is freely rotatable on a crankshaft 20. A solenoid-actuated clutch 22 is provided to drivingly connect the flywheel 16 to the crankshaft 20. The clutch 22 is actuated at suitable points in the cycle of operation of the machine.

The crankshaft 20 drives a ram 24. The ram 24 carries a die shoe 26 which is the upper shoe of a die set. The lower die shoe 28 is fixedly mounted on the support structure 12.

The upper die shoe carries a punch assembly which includes a punch mounting bracket 30 which secures a punch 32 in place. The punch 32 has a longitudinal opening therethrough. The upper portion 34 of the opening receives a spring 36. The lower portion 38 slidably receives a pick-up pin element 40. The portion 38 is of less diameter than portion 34. The pick-up pin element 40 has an enlarged head 42 to maintain it in the punch.

The lower die shoe 28 includes an anvil assembly comprising an anvil holder 44 having a cavity 46 in which is received a spring structure 48. An anvil element 50 is slidably received in an opening 52 which communicates with the cavity 46. The lower end 54 of the anvil element 50 is enlarged to retain the punch element in the anvil holder. It will be appreciated that the spring structure 36, 48 normally bias the pick-up pin and anvil elements to the positions illustrated in FIG. 2. However, during the staking operation to be described, spring 48 permits a small movement of the anvil element to allow for variations in terminal board thickness. Spring 36 will be compressed when pick-up pin element 40 meets anvil element 50.

Figure 4:
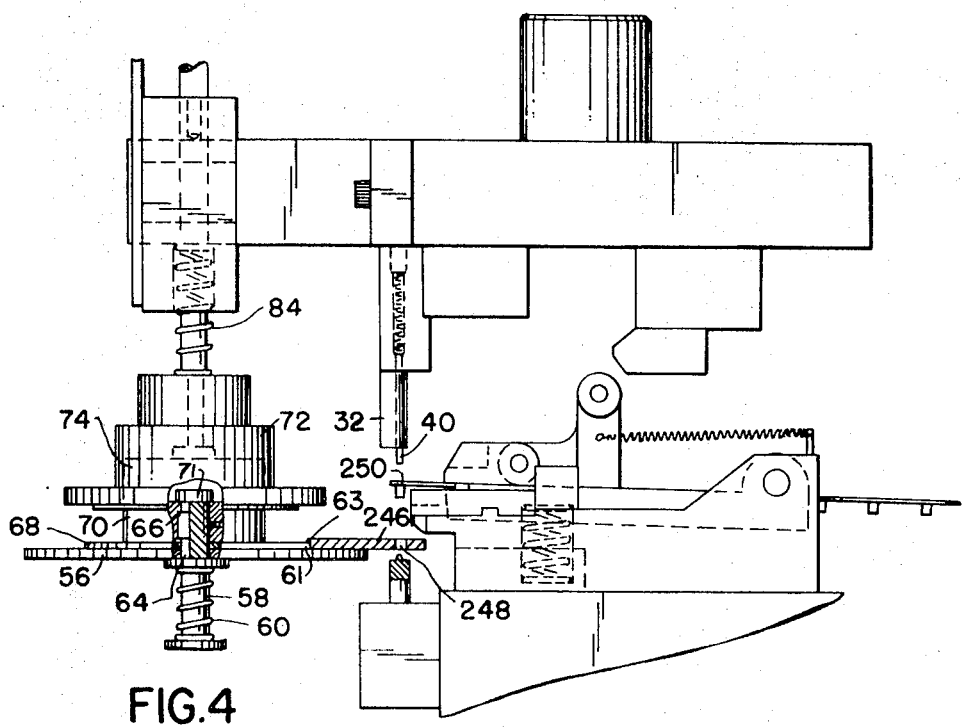
FIGS. 4–9 are front elevational views of the terminal applying mechanism illustrating one cycle of operation.

The bottom die shoe also includes a support table 56 which is mounted on a shaft 58 for rotation therewith. The support table 56 is adapted to receive a semi-circular terminal board. However, the invention may be applied to work members having other shapes such as tubular members. The shaft is suitably journaled in bearing 59. A spring 60 is provided on the shaft 58 between the table 56 and the bearing 59. The table 56, as best seen in FIG. 4, is capable of limited vertical travel on the shaft 58 to permit compression of the spring 60 during the staking operation. As will be noted, the shaft 58 has a key 64 which is received in a keyway 66 provided partly in the table 56 and continued in an arbor element 70. Sliding of the key 64 in the keyway 66 permits limited axial travel of the table while still retaining the table in rotative engagement with the shaft. A disc 68 of less diameter than the table is mounted on the table. The disc 68 acts as a locating device and has a key 61 received in a notch 63 for positioning of the semi-circular terminal board 246 (FIGS. 4, 14) for which this embodiment of the invention is adapted to act upon. The arbor element 70 and hold down collar 71 complete the assembly.

A hat-shaped holder element 72 is provided above the table 56. The holder 72 has a cavity 74 adapted to be received upon the arbor 70. A ring 76 of resilient material is provided on the underside of the holder 72 for non-abrasive contact with the disc 68. The ring 76 also acts to space the holder 72 slightly above a thermal board 246 positioned on the table so that the board is only loosely clamped.

The holder 72 is carried on the lower end of a shaft 78. The shaft 78 is slidably received and journaled in a support structure 80. The support structure 80 has a C-shaped recess 81 which receives a slide element 83 of an L-shaped bracket 85. The bracket 85 is carried on the upper die shoe 26. A spring 84 is provided on the shaft 78 between the holder 72 and support 80. The spring 84 extends into a cavity 86 provided in the lower portion of the support structure 80. The shaft 78 extends through the support structure 80 and thence through an opening 83 in a lift element 89. A collar 87′ is provided on the upper end of the shaft. The lift element 89 is L-shaped and a threaded opening 90 is provided in portion 87. A rod 88 is threadingly received in threaded portion 90 of the support structure. The rod 88 extends from an air cylinder 92. The cylinder 92 is mounted on a bracket 93 carried by the support 80. A spacer 95 is provided between element 89 and the cylinder.

The terminals which are applied to the terminal board 246 are provided as a chain 96 which is fed from a reel 98 along a track 100 provided in a guide element 102. The chain is fed towards punch 32 where each terminal is successively severed from the chain and staked onto the board. As shown in FIG. 15, each terminal 104 in chain 96 comprises a straight flat portion 106 having an oblong opening 108 and a notch 110. The opening and notch ultimately serve as means for securing a wire to the terminal. A square tubular portion 112 extends right-angularly from one end of the straight portion 106. The tubular portion 112 provides the structure for staking the terminal to the board.

The lugs are fed one at a time to the staking mechanism by means of a feed structure 114. The feed structure 114 comprises a feed finger 116 which is pivotally mounted at 118 to a yoke 120. The yoke 120 has a recess 122 which allows for pivotal movement of the end 123 of the feed finger. The other end 124 of the feed finger 116 is pointed for reception in the openings 108 of the terminals. The legs of the yoke 120 are pivotally mounted at 126 to permit pivotal movement of the yoke which, of course, carries with it the feed finger. Pivoting of the yoke 120 to the right as viewed in FIG. 2 results in moving the lower end 124 of the feed finger to the position illustrated in dotted lines. A spring 128 extends between the yoke and feed finger to constantly bias the end 124 of the feed finger downwardly into engagement with the openings in the terminal chain. Movement of the feed finger from the dotted line position illustrated in FIG. 2 to the full line position results in advancing the chain a distance equivalent to one terminal length.

The motive force for actuation of the feed finger is supplied by means of a cam 132 carried by the upper die shoe 26. As illustrated in FIGS. 2 and 3, the cam 130 has an angled cam surface 132 which contacts a roller cam follower 134 upon downward movement of the die shoe 26. The cam follower 134 is mounted on an axle 136 and is positioned at one side of the yoke. A projection 138 extends from the yoke and carries an axle 139. A rod 140 is pivotally mounted at one end to the axle 139. The other end of the rod passes through an opening in a bracket 142. Lock nuts 144 are threadingly received on the outer end of the rod 140 to limit the leftward travel of the rod as viewed in FIG. 2. A spring 146 is received on the rod 140 between the bracket 142 and a stop 148. Movement of the rod 140 to the right as viewed in FIG 2 causes the outer end of the rod to be projected away from the bracket 142 resulting in compression of the spring 146. When the cam 132 moves upwardly with the die shoe after a staking operation, the spring 146 biases the rod back to the solid line position, thus causing the finger 116 to advance the terminal chain to place a new terminal in position for staking. It will be appreciated that advancing of the terminal takes place after each staking operation has occurred and at a point in time when pick-up pin 40 has been retracted to an elevated position.

Means are provided to sever the forward lug from the chain after the pick-up pin element 40 has been lowered to the position illustrated in FIG. 2 wherein it engages the tubular portion 112 of the lug. The cutting means comprises an upper cutter 150 and a lower cutter 152. The cutters have cutting edges 154, 156 which coact to sever the forward lug upon movement of the upper cutter 150 downwardly. The upper cutter 150 is secured to a carrier 158. The carrier 158 is pivotally mounted between brackets 157, 159 on a pin 160. The carrier 158 is moved downwardly by means of an actuator element 162. The actuator element is L-shaped. One leg 164 extends along the surface of the carrier. The leg 164 is pivotally mounted by a pin 166 to the cutter 150. The second leg 168 extends upwardly and has a cam follower 170 mounted on the upper end thereof.

A cam 172 is carried by the die shoe 26. The cam 172 has an upwardly inclined lower cam surface 174 and a downwardly inclined upper cam surface 176. Downward movement of the die shoe results in contact of the cam surface 174 with the cam follower 170. This tends to pivot the actuator clockwise about the pivot point 166 as viewed in FIG. 2. However, clockwise movement is not possible because of the presence of the carrier 158. Consequently, the carrier 158 is driven downwardly carrying with it the upper cutter 150 to result in severing the forward terminal.

Upon upward movement of the cam 172, the cam surface 176 contacts the cam follower 170. The cam surface 176 tends to pivot the actuator counterclockwise as viewed in FIG. 9. The actuator may pivot in the counterclockwise direction. Consequently, the carrier is not caused to move as a result of upward movement of the cam 172. A spring 178 is provided beneath the carrier 158 to restrain downward movement of the carrier and to return the carrier to its original position after the cam 172 ceases to contact the cam follower 170 during downward movement thereof. A spring 180 extends between the actuator 162 and a pin 182. The spring 180 serves to bias the actuator to the position shown in FIG. 2, preventing this element from slipping forwardly to a position where it would not be contacted by the cam 172.

An indexing and drive mechanism are provided for rotating the table 56. This structure is best seen in FIGS. 1, 2, 3, 10 and 11. The drive for the table is taken from the crankshaft 20. A sprocket 184 is provided on the end of the shaft opposite the flywheel 16. A positive-drive timing belt 186 is connected between the sprocket 184 and a similar sprocket 188 provided on a shaft 190. An idler sprocket 192 is provided to properly tension the belt. The shaft 190 is connected to a one to one 90° drive 194 having an output sprocket 196 which is connected by a chain 198 to a sprocket 200 carried on the shaft 58. The sprocket 200 rotates at the same speed as the flywheel. A ring 202 is mounted on the sprocket for rotation therewith. A lobe 204 is carried on the ring 202 and projects outwardly therefrom.

The sprocket 200 is not drivingly connected to the shaft 58 and normally idles therearound. A pair of plates 206, 208 are mounted on the shaft 58 on either side of the sprocket 200. The plates 206, 208 are secured to the shaft for rotation therewith. A disc 210 having a bearing surface is provided beneath the plate 206. A spring 212 is interposed between the disc 210 and the sprocket 200. The spring 212 urges the sprocket downwardly. A friction disc 214 is interposed between the lower plate 208 and the sprocket 200. The spring 212 exerts sufficient force to cause frictional engagement of the disc 214 with the sprocket and the plate 208 to cause rotation of the shaft 58. However this rotation is normally prevented by means of a pawl 216 which engages one of the stop indentations 218, 220, 222, 224 provided on the outer periphery of an index disc 226. The index disc 226 is carried on a hub 228 of the lower plate 208 and is fixedly mounted thereon. As a consequence, when the pawl 216 is engaged with one of the stop indentations on the index disc, rotation of the plate 208 and consequently of the shaft 58 is prevented. During such times, the friction disc 210 is in sliding engagement with the sprocket.

When, as a result of rotation of the sprocket 200, the lobe 204 of ring 202 engages the pawl 216, the pawl is pivoted out of engagement with the stop indentation. The pawl is pivotally mounted at 230. A spring 232 normally biases the pawl into engagement with a stop indentation on the index disc. However, the spring is compressed when the lobe 204 contacts the pawl thus permitting the pawl to be out of engagement with the index disc.

When the pawl is out of engagement with the index disc, the clutching arrangement provided by the friction disc 214 causes all of the discs to rotate with the sprocket 200. As soon as the lobe 204 passes the pawl, the spring 232 biases the pawl back into engagement with the index disc. The pawl 216 will then engage the next stop indentation and rotation of the index disc will cease until the pawl is again lifted out of engagement with the stop. Beceause the ring 202 rotates with the press crankshaft, the index disc will be indexed once per each crankshaft revolution.

The index disc 226 also carries a pair of lobes 234, 236 which are spaced apart 180°. The lobes 234, 236 function to terminate a staking cycle. As will be appreciated, the index disc is set up for two cycles to accommodate the semi-circular terminal boards to which this particular machine is adapted to operate on. A microswitch 238 is provided adjacent to the index disc 226. The microswitch is normally open. A switch arm 240 having a cam follower 242 is provided adjacent to a switch actuating button 244. When one of the lobes 234, 236 depresses the switch arm 240, the switch 238 is closed resulting in ceasing of a cycle.

Figure 5:
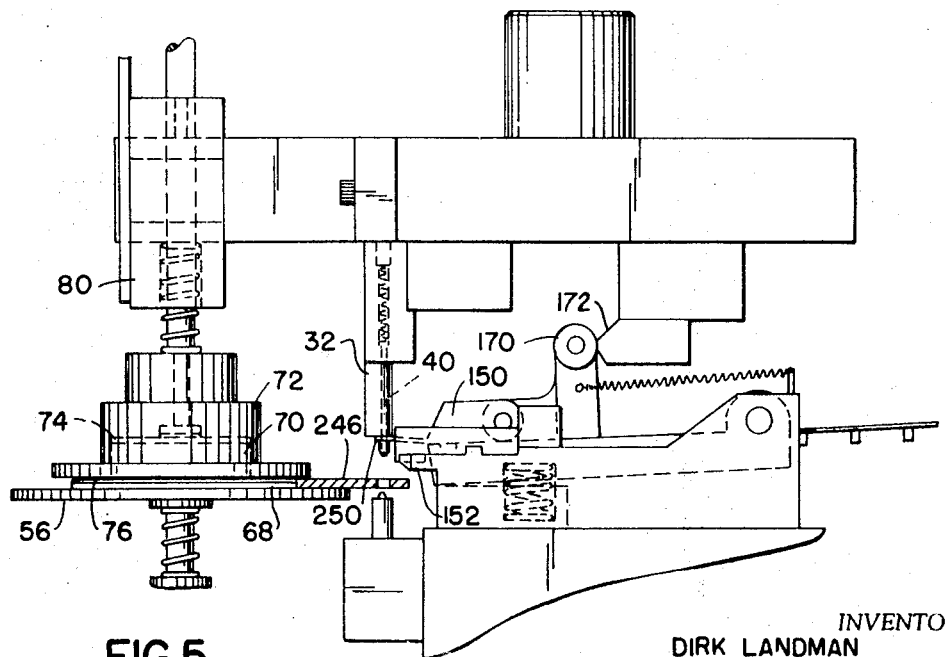

Operation of the machine may now be understood by reference to FIGS. 3–9. A semi-circular terminal board 246 is placed by an operator on the board support table 56. The board is held firmly in place by means of a pair of pressure rollers 247, 249 shown in FIG. 3. The rollers are moved into engagement with the rim of the board by means of air cylinders 251, 253. The terminal board has a plurality of openings 248 for mounting of the lugs. Initiation of a cycle is begun by closing a foot switch. The clutch 22 is actuated causing the upper die shoe 26 to descend. The die shoe carries the pick-up pin 40 downwardly towards the forward lug 250. At the same time, the cylinder 92 is actuated resulting in the holder 72 descending. The holder is urged downwardly by spring 84 and by gravity. As shown in FIGS. 4 and 5, the holder descends and comes to rest with the arbor 70 received in the cavity 74 and the ring 76 contacting the disc 68. A slight clearance remains between the holder 72 and the board 246. The function of holder 72 is not to tightly clamp the board but to prevent tipping of the board off the board support table 56. The loose clamp permits the terminal 250 to seat properly during the staking operation. As previously mentioned, the board is keyed by key 61 so that it is properly positioned.

The pick-up pin member 40 also, at this time, as shown in FIG. 5, engages the tubular portion of the lug 250. The cam 172 is also at this time engaged with the cam follower 170 causing the cutting elements 150, 152 to sever the lug 250 from the chain.

Figure 6:
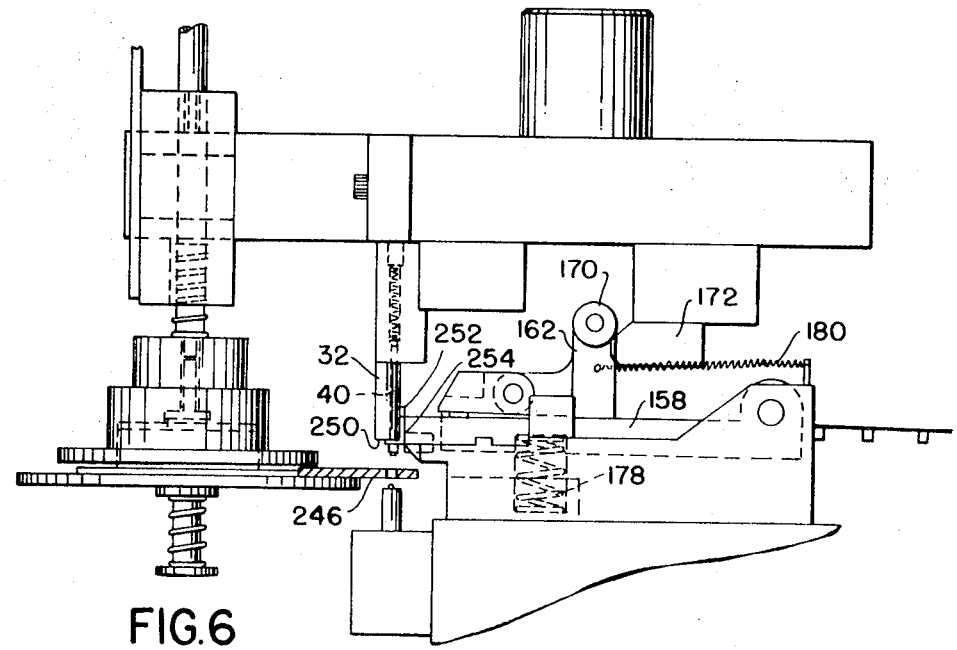

As illustrated in FIG. 6, further downward movement of the die shoe causes the lug 250 to be moved downwardly whereupon a portion 252 is wiped against the surface 254 bending the lug into an L-shape. At this time, the cam 172 has passed by the cam follower 170, permitting the springs 178, 180 to retract the carrier 158 and actuator 162 back to their initial positions.

Figure 7:
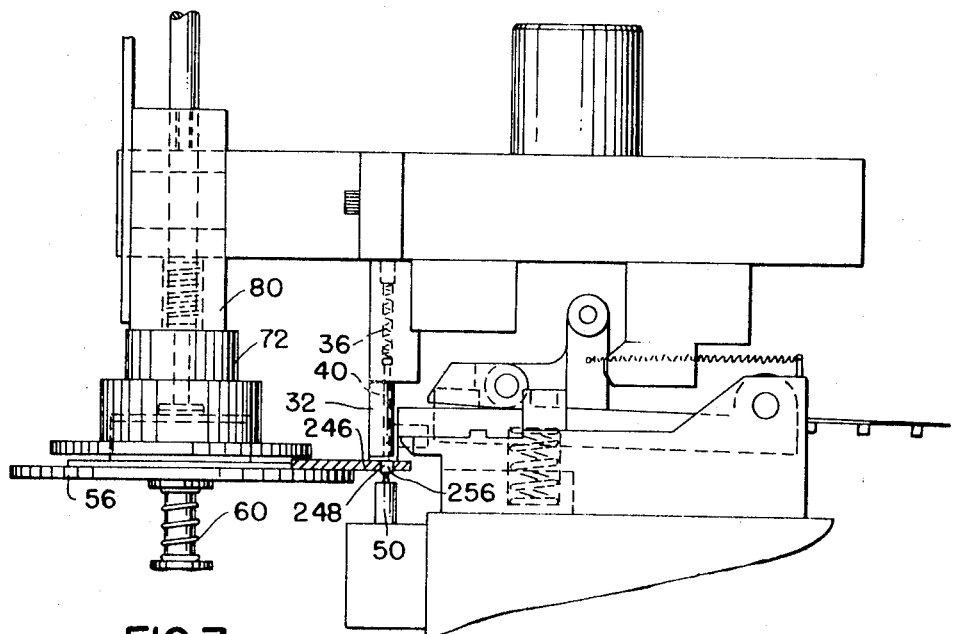

As shown in FIG. 7, continued downward movement of the punch member 32 causes the cylindrical portion 256 of the lug to enter the opening 248 and seat the terminal on top of board 246. At this time, the support 80 has contacted the holder 72 and further downward movement thereof will cause collapse of the spring 60 and downward movement of the table 56 and holder 72 causing the board 246 to be moved downwardly with the punch 32. Additionally, the pick-up pin 40 contacts the anvil 50 collapsing the spring 36.

Figure 8:
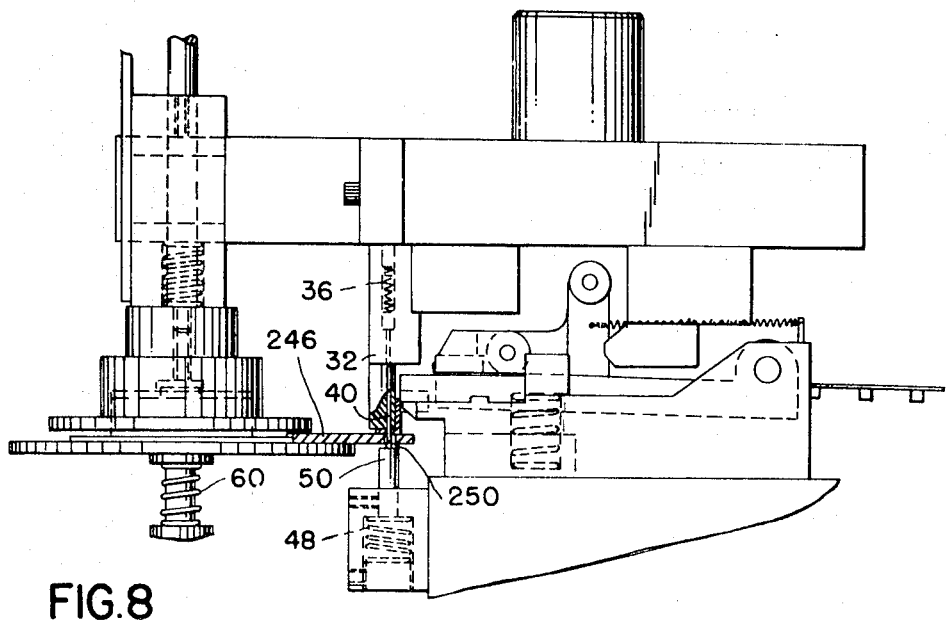

Then, as shown in FIG. 8, further downward movement of the punch member 32 results in staking over of the lower tubular portion of the terminal thus securing the terminal to the board. At this point, the spring 60 is collapsed. Movement of the board 250 along with the punch member 32 during the actual staking operation prevents rocking of the board and results in satisfactory seating of the terminal.

Figure 9:
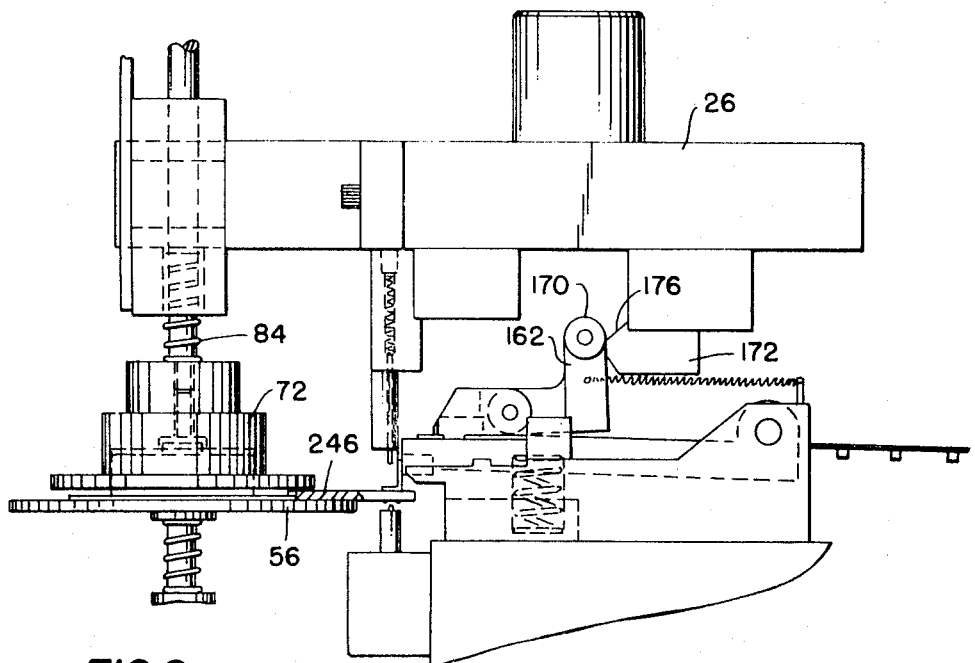

At the termination of the staking operation, the die shoe 26 is raised back to its original position. As illustrated in FIG. 9, upon rising, the cam 172 again contacts the cam follower 170. The cam surface 176 causes the actuator 162 to pivot in a counterclockwise direction as viewed in FIG. 9 without resulting in a cutting action. At this time, a new lug is fed into position for staking. The board support table 56 is also, at this time, indexed to a new position and, depending upon the point in the cycle, the board 246 is either rotated for application of an additional terminal or manually removed from the support table 56. At the end of the cycle, air cylinder 92 is retracted to lift the holder 72 away from the table 56 and to compress spring 84.

FIG. 13 illustrates the electrical control circuit for the machine 10. Leads 258, 260 extend from a source of electrical power 262. A main switch 264 controls application of power to the circuit. A lead 266 connects the motor 14 across power. Consequently, when the switch 264 is closed, the motor is energized. A manually operated switch 272 is provided in a lead 274. The switch 272 is the foot switch previously mentioned which is actuated by the operator of the machine to begin a cycle. A solenoid 276 is provided in a lead 278. Energizing the solenoid 276 causes the clutch 22 to engage. A second solenoid 280 is provided in a lead 282 in parallel with the solenoid 276. The solenoid 280, when energized, causes the air cylinder 92 to be depressurized, thus freeing the holder 72 for downward movement. A relay coil 270 is provided in a lead 284 in parallel with the solenoids 276, 280. Another coil relay 268 is provided in lead 274. The relay 270 has one set of normally open contacts 286 which are provided in lead 278 between the relay 270, solenoids 276, 280, and power. Thus contacts 286 normally prevent the application of power to these components. The relay 268 has two sets of contacts 288, 290. The contacts 288 are normally closed and are located in lead 278 between the contacts 286 and the components 270, 276, 280. The other set of contacts 290 of relay 268 are normally open. Contacts 290 are located in lead 274 between switch 272 and the relay 268. A lead 292 extends from lead 278 from a point between contacts 286, 288 into connection with lead 274 at a point between switch 272 and contacts 290.

It will thus be appreciated that closure of switch 272 by an operator results in applicator of power to relay 270, solenoid 276 and solenoid 280. Application of power to these components results in the top die shoe 26 being driven downwardly, the punch member 32 being driven downwardly, closure of the contacts 286 of the relay 270, and downward movement of holder 72. Closure of contacts 286 results in continuation of application of power to the components 270, 276, 280 after the operator allows switch 272 to re-open.

As previously described, at the conclusion of a staking operation, the die shoe 26 is returned to its initial position, the board support table is indexed to a new position, and a new terminal is fed into position for staking. After all of the terminals have been staked on a board, the index switch 238 is closed by one of the lobes 234, 236. This discontinues operation of the machine until a new board is loaded onto the board support table 56. It will be noted that a lead 294 connects the switch 238 across the switch 272 and normally open contact 290 of the relay 268. Closure of switch 238 thus results in applying power to the coil of relay 268 whereupon the contacts 288 open and the contacts 290 close. Opening of contacts 288 results in discontinuing the application of power to the coil of relay 270, solenoid 276 and solenoid 280. Contacts 290 are also closed and assure that the machine is deactivated even if switch 272 is held in the on position. Upon de-energization of relay 270, the contacts 286 open thus preventing reactivation of these components until the switch 272 is again closed by the machine operator.

What we claim as our invention is:

1. A machine for applying terminals to a work member having opening means therein for staking of a terminal thereon, comprising a support structure for the work member, resilient means biasing said support structure to one position, holding means to releasably secure a work member onto the support structure, a staking mechanism, said staking mechanism including a punch element and an anvil element each positioned on one side of, spaced from and in alignment with an opening of the work member mounted on the support structure, one of said punch and anvil elements being movable, means to drive said movable element towards the other of said elements to stake a terminal onto the work member, and means to move said support structure against said resilient means simultaneously with movement of said movable element and at the same rate whereby the work member is carried towards the other of said punch and anvil elements with the movable element during the staking operation.

2. A machine as defined in claim 1 and further characterized in that said holding means includes structure for only loosely clamping the work member in the direction of movement of said movable element and support structure whereby a work member may tilt during the staking operation.

3. A machine as defined in claim 2 and further characterized in that said holding means includes additional structure to firmly clamp the work member in a direction normal to movement of said movable element and support structure.

4. A machine as defined in claim 1 and further characterized in the provision of indexing means for moving said support structure after each staking operation to position an additional opening in the work member in alignment with the punch and anvil elements to permit staking of a plurality of terminals onto the work member.

5. A machine as defined in claim 1 and further characterized in the provision of means for supporting a chain form of terminals, means for successively moving the endmost terminal of a chain in alignment with said punch and anvil elements, and means for severing the endmost terminal from the chain form during the staking operation.

6. A machine as defined in claim 1 and further characterized in the provision of resilient support structure for one of said punch and anvil elements to permit deflection thereof during the staking operation to compensate for variations in the thickness of work members.

7. A machine for applying terminals to a work member having an opening therein for staking of a terminal thereon, comprising a support structure for the work member, a staking mechanism, said staking mechanism including a punch element and an anvil element each positioned on one side of and spaced from and in alignment with an opening of the work member mounted on the support structure, one of said punch and anvil elements being movable, means to drive said movable element towards the other of said elements to stake a terminal onto a work member, holding means including structure to loosely secure the work member onto the support structure in the direction of movement of said movable element to permit slight tilting of the work member during a staking operation, and indexing means for moving said support structure after each staking operation to position an additional opening in the work member in alignment with the punch and anvil elements to permit staking of a plurality of terminals onto the work member.

8. A machine as defined in claim 7 and further characterized in the provision of resilient means biasing said support structure to one position, and means to move said support structure against said resilient means simultaneously with movement of said movable element and at the same rate whereby a work member is carried towards the other of said punch and anvil elements during the staking operation.

9. A machine as defined in claim 7 and further characterized in that said holding means includes additional structure to firmly clamp the work member in a direction normal to movement of said movable element.

10. A machine as defined in claim 7 and further characterized in the provision of means for supporting a chain form of terminals, means for successively moving the endmost terminal of a chain in alignment with said punch and anvil elements, and means for severing the endmost terminal from the chain form during the staking operation.

11. A machine as defined in claim 7 and further characterized in the provision of resilient support structure for one of said punch and anvil elements to permit deflection thereof during the staking operation to compensate for variations in the thickness of work members.

12. A machine for successively staking terminals onto an arcuate terminal board having openings therein for staking of terminals thereon, comprising a support structure for the board, spring means biasing said support structure to a normal position, holding means to releasably secure a work member onto the support structure, said holding means including first clamp means for engagement with the outer rim of a board, second clamp means normal to the first clamp means positionable adjacent to but spaced from a board to permit tilting of the board during a staking operation, a staking mechanism, said staking mechanism including a punch element and an anvil element each positioned on one side of, spaced from and in alignment with one opening of the board mounted on the support structure, one of said punch and anvil elements being movable, means to drive said movable element toward the other of said elements to stake a terminal onto the board, means to move said support structure against said spring means simultaneously with movement of said movable element and at the same rate whereby a board is carried towards the other of said elements during the staking operation, indexing means for rotating said support structure after each staking operation to position an additional opening in the board in alignment with the punch and anvil elements to permit staking of a plurality of terminals onto the board, means for supporting a chain of terminals, means for successively moving the endmost terminal of the chain in alignment with said punch and anvil elements, means for severing the endmost terminal from the chain during the staking operation, and resilient support structure for one of said punch and anvil elements to permit deflection thereof during the staking operation to compensate for variations in the thickness of work members.

13. A machine as defined in claim 12 and further characterized in that said means for severing the endmost terminal from the chain is spaced laterally of the punch and anvil whereby material of the endmost terminal extends laterally from the punch and anvil after severance of the terminal, and a wiping surface located intermediate the means for severing the terminal and the punch and anvil whereby a portion of the terminal is bent at an angle to the remaining portion during the staking operation.

14. A machine for successively staking terminals onto an arcuate terminal board having openings therein for staking of terminals thereon, comprising an upper die shoe and a lower die shoe, drive means for moving said upper die shoe through a downward stroke and an upward stroke, a support structure for the board, a shaft for said support structure, a bearing carried on said lower die shoe rotatably receiving said shaft, a spring structure between said bearing and said support structure biasing said support structure to a normal position, a clamp positioned above the support structure, means to move the clamp into clamping engagement with the support structure in a position adjacent to but spaced from the board located on the support structure to permit tilting of the board during a staking operation, a punch element carried by the upper die shoe, an anvil element carried by the lower die shoe, said punch, upon the downward stroke of the upper die shoe, acting to engage a terminal, move the terminal to seat the terminal in an opening of the board and contact the anvil, and then move to stake the terminal to the board, an actuator carried by the upper die shoe, said actuator being spaced over said clamp a distance to abut said clamp after seating of the terminal and move the clamp, support structure and board along with the punch and against the action of said spring structure during staking over of the terminal.

15. A machine as defined in claim 14 and further characterized in that said clamp is hat-shaped having a lower rim portion with a body portion extending upwardly therefrom, said body portion having a cylindrical recess therein extending from the underside thereof, a cylindrical arbor on the support structure in alignment with said recess and received therein upon engagement of the clamp with the support structure, a spacer on the underside of the clamp to position the rim above the support structure upon engagement of the clamp with the support structure, a disk on the support structure of larger diameter than the arbor but less diameter than said rim, said disk acting to position the board on the support structure with a portion thereof beneath said rim to permit said tilting.

16. A machine as defined in claim 14 and further characterized in that said means to move the clamp into clamping engagement with the support structure comprise a rod extending upwardly from the clamp, a journal for the rod, a spring on the rod between the clamp and journal, power means in engagement with the rod normally maintaining the rod and clamp in an upper position causing compression of the spring, and means to release said power means whereby said spring and gravity bias the clamp into said clamping engagement.

17. A machine as defined in claim 14 and further characterized in the provision of indexing means drivingly connected to said shaft to successively rotate said support structure through a cycle of staking operations, a key and keyway structure in the shaft and support structure connecting the shaft to the support structure for rotation therewith but permitting the support structure limited axial movement with respect to the shaft.

References Cited
UNITED STATES PATENTS

| | | | |
|---|---|---|---|
| 3,150,790 | 9/1964 | Beneteau | 227—57 |
| 3,302,274 | 2/1967 | Stoltz | 29—203 B |
| 3,307,244 | 3/1967 | De Shong | 29—203 B |
| 3,484,935 | 12/1969 | Burns | 29—628 |

THOMAS H. EAGER, Primary Examiner